United States Patent
Mealy et al.

(10) Patent No.: US 8,717,617 B1
(45) Date of Patent: *May 6, 2014

(54) POSITIONING AND PRINTING OF A HANDHELD DEVICE

(71) Applicant: Marvell International Ltd., Hamilton (BM)

(72) Inventors: James Mealy, Corvallis, OR (US); James D. Bledsoe, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,735

(22) Filed: Nov. 16, 2012

Related U.S. Application Data

(63) Continuation of application No. 12/394,871, filed on Feb. 27, 2009, now Pat. No. 8,314,942.

(60) Provisional application No. 61/037,548, filed on Mar. 18, 2008.

(51) Int. Cl.
*G06K 15/10* (2006.01)

(52) U.S. Cl.
USPC ............ 358/1.5; 400/88; 400/55; 358/1.1; 358/1.12; 358/1.9; 347/109

(58) Field of Classification Search
USPC ........................................ 358/1.5
See application file for complete search history.

(56) References Cited

U.S. PATENT DOCUMENTS

| | | |
|---|---|---|
| 6,597,806 B1 | 7/2003 | Kawada |
| 6,940,619 B1 | 9/2005 | Easwar |
| 2004/0189731 A1 | 9/2004 | Robert Walmsley et al. |
| 2008/0123018 A1 | 5/2008 | Ahn et al. |
| 2009/0040286 A1 | 2/2009 | Tan et al. |

*Primary Examiner* — Firmin Backer
*Assistant Examiner* — Brendan McCommas

(57) ABSTRACT

Embodiments of the present invention provide a handheld device comprising an input/output (I/O) module configured to at least one of print and scan images on a surface adjacent to the handheld device, a position module operatively coupled with the I/O module to determine at least one of a position and a velocity of the handheld device, and a filter coupled to the I/O module to regulate a rate of deposition of a printing substance by the I/O module.

20 Claims, 11 Drawing Sheets

US 8,717,617 B1

POSITIONING AND PRINTING OF A HANDHELD DEVICE

CROSS REFERENCE TO RELATED APPLICATIONS

The present disclosure is a continuation of and claims priority to U.S. patent application Ser. No. 12/394,871, filed Feb. 27, 2009, now U.S. Pat. No. 8,314,942, issued Nov. 20, 2012, which claims priority to U.S. Provisional Patent Application No. 61/037,548, filed Mar. 18, 2008, which are incorporated herein by reference.

TECHNICAL FIELD

Embodiments of the present invention relate to the field of image translation and, more particularly, to positioning and printing techniques of a handheld image translation device.

BACKGROUND

Traditional printing devices rely on a mechanically operated carriage to transport a print head in a linear direction as other mechanics advance a medium in a direction orthogonal to the print head linear direction. As the print head moves over the medium, an image may be deposited to the medium. Portable printers have been developed through technologies that reduce the size of the operating mechanics. However, the principles of providing relative movement between the print head and medium remain the same as traditional printing devices. Accordingly, these mechanics may limit the reduction of size of the printer, the material that may be used as the medium, and the manner that images are printed.

Handheld devices are emerging that allow an operator to manipulate the handheld device over a medium to scan or print an image. However, such handheld devices are challenged by the unpredictable and nonlinear movement of the device by the operator. For example, the variations of operator movement, including rotation of the device, make it difficult to determine the precise location of a print head or scanning sensor relative to the medium. This type of positioning error may diminish the quality of scanned or printed images.

Current sensor schemes for positioning and navigation of a handheld device over a medium may have position accuracy errors that stem from inadequate sensor accuracy or inherent sensor error associated with a distance traveled by the sensor during a navigation process. Such sensor schemes may operate on a medium such that only relative positioning to a previous point on the medium is obtainable as opposed to absolute positioning relative to the medium. A handheld printing device using such sensor schemes may lose position information when lifted away from the medium reducing the ease of printing. Moreover, a printing device using such sensor schemes may not be able to determine a relative position to the medium when returned to the medium after being lifted away.

Positioning errors may have deleterious effects on print quality. For example, variations of print density may be discernible in printed images made by emerging handheld printing devices. Errors may be attributed to variability of sensor timing and other inaccuracies associated with positioning. For example, predictive processes that may be used to determine positioning may have positioning errors caused by delays in obtaining information from sensors. Extrapolated positions computed from inaccurate position data may further exacerbate such errors. Print quality may be further diminished when all printing material is deposited in a single pass as opposed to multiple passes

SUMMARY

The present invention provides a handheld device comprising an input/output (I/O) module configured to at least one of print and scan images on a surface adjacent to the handheld device, a position module operatively coupled with the I/O module to determine at least one of a position and a velocity of the handheld device, and a filter coupled to the I/O module to regulate a rate of deposition of a printing substance by the I/O module.

In accordance with various embodiments, the position module is configured to determine the at least one of a position and a velocity of the handheld device using surface markings located on the surface adjacent to the handheld device, wherein the surface markings are configured to provide absolute position information of the surface relative to the handheld device.

In accordance with various embodiments, the filter comprises a comparator to compare a print velocity term with a random or pseudo-random number, wherein the print velocity term is a variable threshold. In accordance with such embodiments, the filter also comprises a barrel shifter coupled to the comparator to increase the print velocity term and output the print velocity term to the comparator, and a look-up table configured to output a value to the barrel shifter, wherein the value from the look-up table increases the print velocity term for a decreasing quantity of printing substance to be deposited.

In accordance with various embodiments, the I/O module is configured to deposit the printing substance if the print velocity term is greater than the random or pseudo-random number as determined by the comparator.

In accordance with various embodiments, the filter is configured to regulate the rate of deposition of the printing substance by the I/O module such that the amount of printing substance deposited is proportional to a velocity of the handheld device as determined by the position module.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Embodiments of the present invention may describe methods, systems, and apparatuses for determining position of a handheld device, printing with a handheld device, and associated techniques and configurations. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
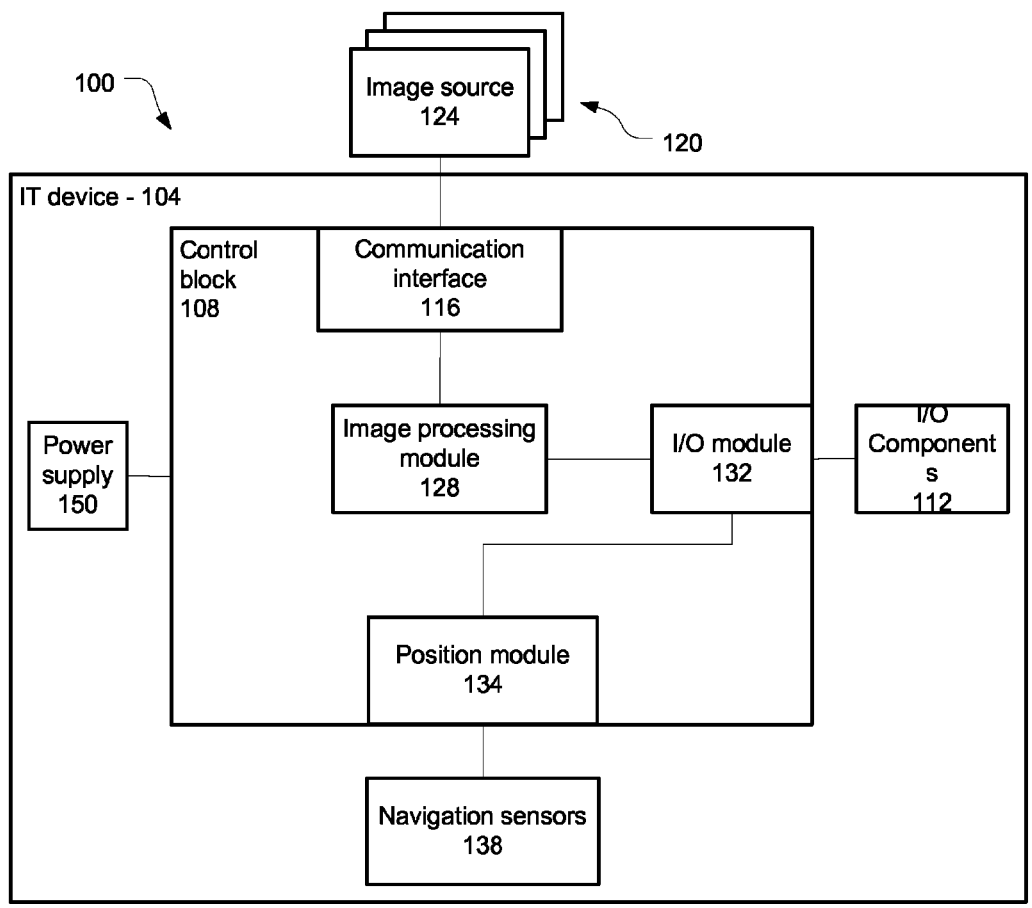
FIG. 1 is a schematic of a system including a handheld image translation device in accordance with various embodiments of the present invention.

FIG. 1 is a schematic of a system 100 including a handheld image translation (IT) device 104 in accordance with various embodiments of the present invention. The IT device 104 may include a control block 108 with components designed to facilitate precise and accurate positioning of input/output (I/O) components 112 throughout an entire IT operation. This positioning may allow the IT device 104 to reliably translate an image in a truly mobile and versatile platform as will be explained herein.

Image translation, as used herein, may refer to a translation of an image that exists in a particular context (e.g., medium) into an image in another context. For example, an IT operation may be a scan operation. In this situation, a target image, e.g., an image that exists on a tangible medium, is scanned by the IT device 104 and an acquired image that corresponds to the target image is created and stored in memory of the IT device 104. For another example, an IT operation may be a print operation. In this situation, an acquired image, e.g., an image as it exists in memory of the IT device 104, may be printed onto a medium.

The control block 108 may include a communication interface 116 configured to communicatively couple the control block 108 to an image transfer device 120. The image transfer device 120 may include any type of device capable of transmitting/receiving data related to an image, or image data, involved in an IT operation. The image transfer device 120 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 120 is a removable storage device, e.g., a universal serial bus (USB) storage device, the communication interface 116 may be coupled to a port, e.g., USB port, of the IT device 104 designed to receive the storage device.

The communication interface 116 may include a wireless transceiver to allow the communicative coupling with the image transfer device 120 to take place over a wireless link. The image data may be wirelessly transmitted over the link through the modulation of electromagnetic waves with frequencies in the radio, infrared or microwave spectrums.

A wireless link may contribute to the mobility and versatility of the IT device 104. However, some embodiments may additionally/alternatively include a wired link communicatively coupling the image transfer device 120 to the communication interface 116.

In some embodiments, the communication interface 116 may communicate with the image transfer device 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

When the IT operation includes a print operation, the communication interface 116 may receive image data from the image transfer device 120 and transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image transfer device 120 or another device. The processed image may then be transmitted to an I/O module 132, which may function as a print module in this embodiment, where it is cached in anticipation of the print operation.

The I/O module 132, which may be configured to control the I/O components 112, may receive positioning information indicative of a position of a print head of the I/O components 112 relative to a reference location from a position module 134. The position module 134 may control one or more navigation sensors 138 to capture navigational measurements to track incremental movement of the IT device 104 relative to the reference location.

In some embodiments, the navigational measurements may be navigational images of a medium adjacent to the IT device 104. In these embodiments, the navigation sensors 138 may include one or more imaging navigation sensors. An imaging navigation sensor may include a light source, e.g., light-emitting diode (LED), a laser, etc., and an optoelectronic sensor designed to capture a series of navigational images of an adjacent medium as the IT device 104 is moved over the medium. In accordance with various embodiments of the present invention, the navigation sensors 138 comprise infrared complementary metal oxide semiconductor (IR CMOS) sensors, also known in the art as IR cameras.

The position module 134 may process the navigational images to detect structural variations of the medium. The movement of the structural variations in successive images may indicate motion of the IT device 104 relative to the medium. Tracking this relative movement may facilitate determination of the precise positioning of the navigation sensors 138. The navigation sensors 138 may be maintained in a structurally rigid relationship with the I/O components 112, thereby allowing for calculation of the precise location of the I/O components 112.

The navigation sensors 138 may have operating characteristics sufficient to track movement of the IT device 104 with the desired degree of precision. In one example, imaging navigation sensors may process approximately 2000 frames per second, with each frame including a rectangular array of 30×30 pixels. Each pixel may detect a six-bit grayscale value, e.g., capable of sensing 64 different levels of patterning.

Once the I/O module 132 receives the positioning information it may coordinate the location of the print head to a portion of the processed image with a corresponding location. The I/O module 132 may then control the print head of the I/O components 112 in a manner to deposit a printing substance on the medium adjacent to the IT device 104 to represent the corresponding portion of the processed image.

The print head may be an inkjet print head having a plurality of nozzles designed to emit liquid ink droplets. The ink, which may be contained in reservoirs or cartridges, may be black and/or any of a number of various colors. A common, full-color inkjet print head may have nozzles for cyan, magenta, yellow, and black ink. Other embodiments may utilize other printing techniques, e.g., toner-based printers such as laser or LED printers, solid ink printers, dye-sublimation printers, inkless printers, etc.

In an embodiment in which an IT operation includes a scanning operation, the I/O module 132 may function as an image capture module and may be communicatively coupled to one or more optical imaging sensors of the I/O components 112. Optical imaging sensors, which may include a number of individual sensor elements, may be designed to capture a plurality of surface images of a medium adjacent to the IT device 104. The surface images may be individually referred to as component surface images. The I/O module 132 may generate a composite image by stitching together the component surface images. The I/O module 132 may receive positioning information from the position module 134 to facilitate the arrangement of the component surface images into the composite image.

Relative to the imaging navigation sensors, the optical imaging sensors may have a higher resolution, smaller pixel size, and/or higher light requirements. While the imaging navigation sensors are configured to capture details about the structure of the underlying medium, the optical imaging sensors may be configured to capture an image of the surface of the medium itself.

In an embodiment in which the IT device 104 is capable of scanning full color images, the optical imaging sensors may have sensor elements designed to scan different colors.

A composite image acquired by the IT device 104 may be subsequently transmitted to the image transfer device 120 by, e.g., e-mail, fax, file transfer protocols, etc. The composite image may be additionally/alternatively stored locally by the IT device 104 for subsequent review, transmittal, printing, etc.

In addition (or as an alternative) to composite image acquisition, an image capture module may be utilized for calibrating the position module 134. In various embodiments, the component surface images (whether individually, some group, or collectively as the composite image) may be compared to the processed print image rendered by the image processing module 128 to correct for accumulated positioning errors and/or to reorient the position module 134 in the event the position module 134 loses track of its reference point. This may occur, for example, if the IT device 104 is removed from the medium during an IT operation.

The IT device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image transfer device 120, a power cord coupled to an alternating current (AC) outlet, etc.).

Figure 2:
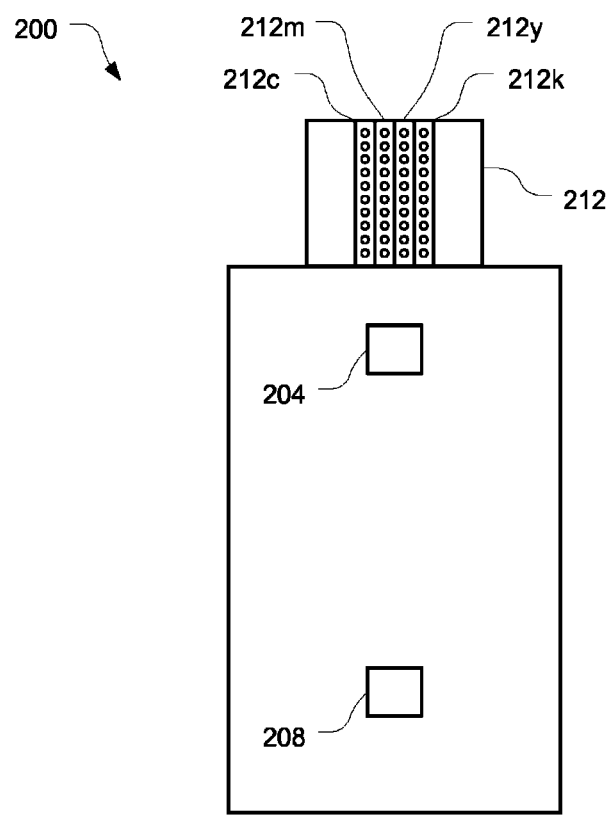
FIG. 2 is a bottom plan view of a handheld image translation device in accordance with various embodiments of the present invention.

FIG. 2 is a bottom plan view of an IT device 200 in accordance with various embodiments of the present invention. The IT device 200, which may be substantially interchangeable with IT device 104, may have a first navigation sensor 204, a second navigation sensor 208, and a print head 212. Those skilled in the art will understand that more or fewer navigation sensors may be included as desired depending upon the application.

The navigation sensors 204 and 208 may be used by a position module, e.g., position module 134, to determine positioning information related to the print head 212. As stated above, the proximal relationship of the print head 212 to the navigation sensors 204 and 208 may be fixed to facilitate the positioning of the print head 212 through information obtained by the navigation sensors 204 and 208.

The print head 212 may be an inkjet print head having a number of nozzle rows for different colored inks. In particular, and as shown in FIG. 2, the print head 212 may have a nozzle row 212c for cyan-colored ink, a nozzle row 212m for magenta-colored ink, a nozzle row 212y for yellow-colored ink, and nozzle row 212k for black-colored ink.

While the nozzle rows 212c, 212m, 212y, and 212k shown in FIG. 2 are arranged in rows according to their color, other embodiments may intermix the different colored nozzles in a manner that may increase the chances that an adequate amount of appropriate colored ink is deposited on the medium through the natural course of movement of the IT device 200 over the medium.

Figure 3:
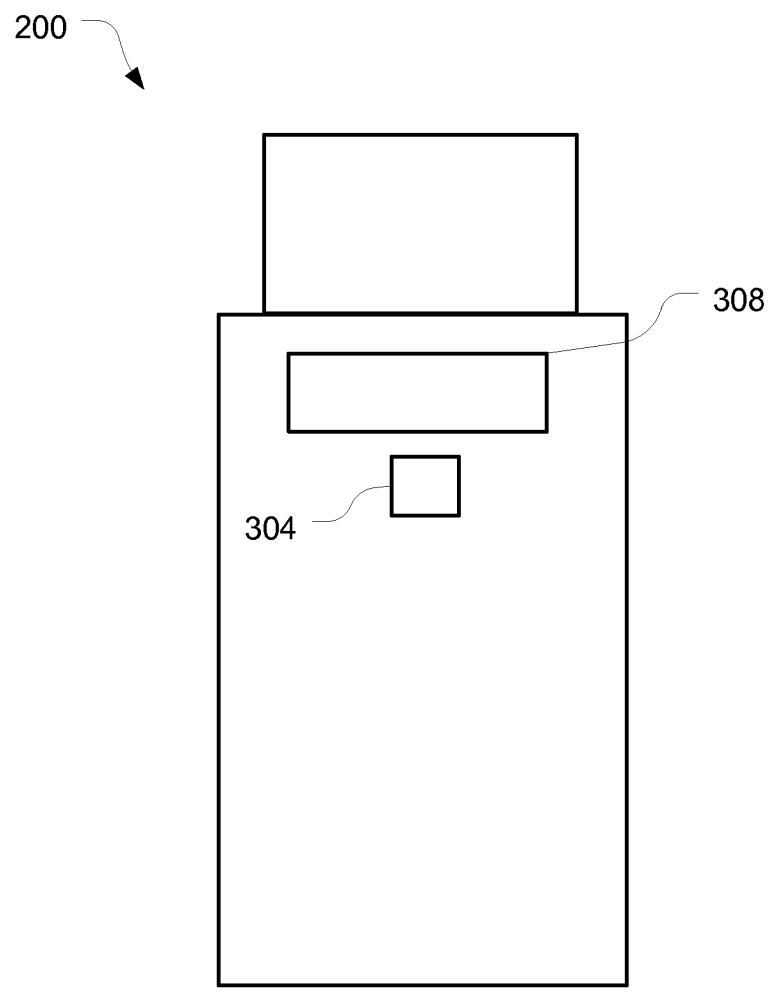
FIG. 3 is a top plan view of a handheld image translation device in accordance with various embodiments of the present invention.

FIG. 3 is a top plan view of the IT device 200 in accordance with various embodiments of the present invention. The IT device 200 may have a variety of user input/outputs to provide the functionality enabled through use of the IT device 200. Some examples of input/outputs that may be used to provide some of the basic functions of the IT device 200 include, but are not limited to, an IT control input 304 to initiate/resume a print and/or scan operation and a display 308.

The display 308, which may be a passive display, an interactive display, etc., may provide the user with a variety of information. The information may relate to the current operating status of the IT device 200 (e.g., printing, scanning, ready to print, ready to scan, receiving image data, transmitting image data, etc.), power of the battery, errors (e.g., positioning/printing/scanning error, etc.), instructions (e.g., "place IT device on medium prior to initiating IT operation," etc.). If the display 308 is an interactive display it may provide a control interface in addition to, or as an alternative from, the IT control input 304.

Figure 4:
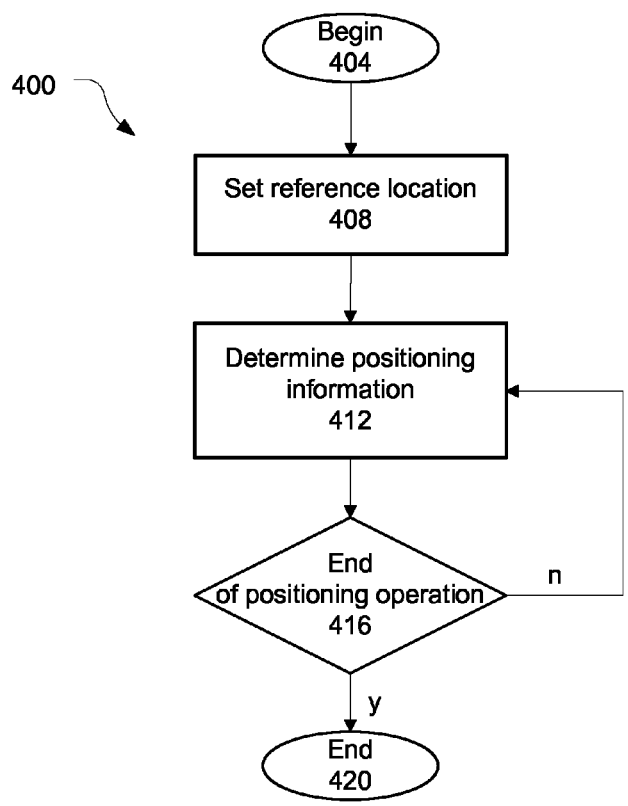
FIG. 4 is a flow diagram depicting a positioning operation of a handheld image translation device in accordance with various embodiments of the present invention.

FIG. 4 is a flow diagram 400 depicting a positioning operation of the IT device 200 in accordance with various embodiments of the present invention. A positioning operation may begin at block 404 with an initiation of a printing operation, e.g., by activation of the IT control input 304. A position module within the IT device 200 may set a reference location at block 408. The reference location may be set when the IT device 200 is placed onto a medium at the beginning of an IT operation. This may be ensured by the user being instructed to activate the IT control input 304 once the IT device 200 is in place and/or by the proper placement of the IT device 200 being treated as a condition precedent to instituting the positioning operation. In some embodiments the proper placement of the IT device 200 may be automatically determined through the navigation sensors 204 and/or 208 and/or some other sensors (e.g., a proximity sensor).

Once the reference location is set at block 408, the position module may determine positioning information, e.g., translational and rotational changes from the reference location, using the navigation sensors 204 and 208, and transmit the determined positioning information to an I/O module at block 412. The translational changes may be determined by tracking incremental changes of the positions of a navigation sensor along a two-dimensional coordinate system, e.g., $\Delta x$ and $\Delta y$. Rotational changes may refer to changes in the angle of the IT device 200, e.g., $\Delta \theta$, with respect to, e.g., the y-axis. These transitional and/or rotational changes may be determined by the position module comparing consecutive navigational measurements taken by the navigation sensors 204 and 208 to detect these movements. This process may be further explained by reference to FIG. 5 and corresponding discussion.

While embodiments of the present invention discuss tracking an IT device in a two-dimensional coordinate system, other embodiments may include tracking within a three-dimensional coordinate system. Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 5:
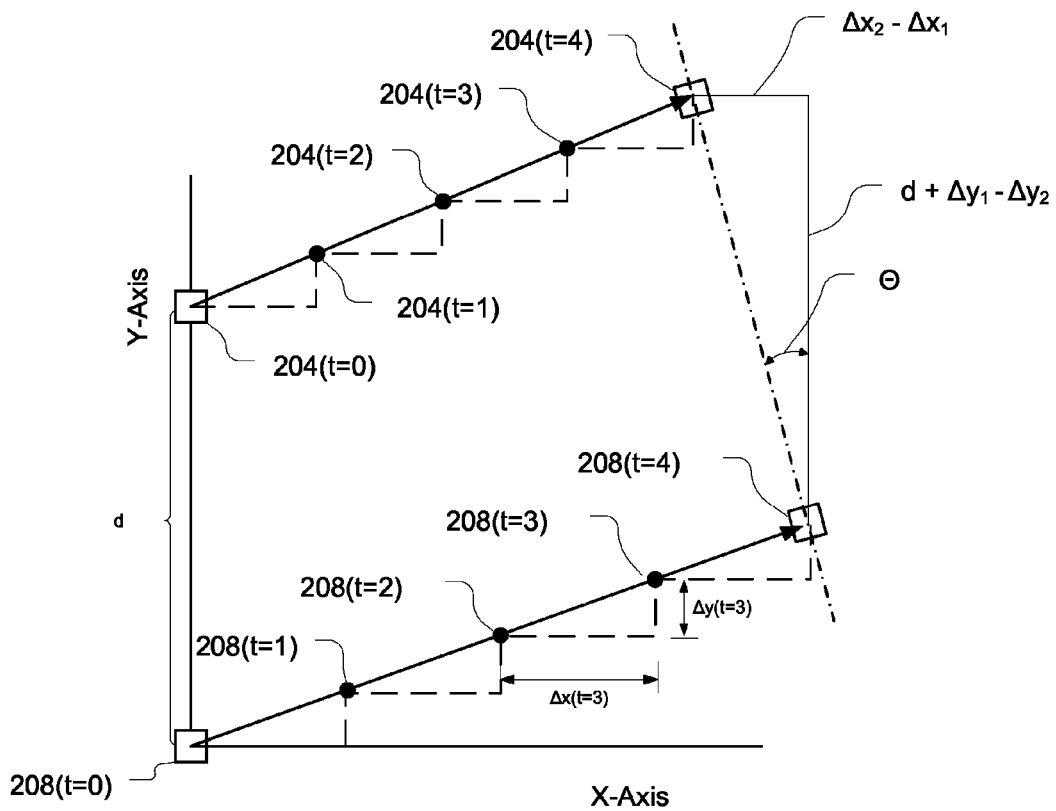
FIG. 5 is a graphic depiction of a positioning operation of a handheld image translation device in accordance with various embodiments of the present invention.

FIG. 5 is a graphic depiction of a positioning operation of the IT device 200 in accordance with embodiments of the present invention. At initiation, e.g., t=0, the sensors 204 and 208 may be in an initial position indicated by 204($t=0$) and 208($t=0$), respectively. Over successive time intervals, e.g., t=1-4, the sensors 204 and 208 may be moved to an end position indicated by 204($t=4$) and 208($t=4$), respectively. As used in description of this embodiment, the "initial position" and the "end position" are used merely with reference to this particular operation and not necessarily the start or end of the printing operation or even other positioning operations.

As the sensors 204 and 208 are moved, they may capture navigational measurements at each of the indicated time intervals, e.g., t=0-4. The capture period may be synchronized between the sensors 204 and 208 by, e.g., hardwiring together the capture signals transmitted from the position module. The capture periods may vary and may be determined based on set time periods, detected motion, or some other trigger. In some embodiments, each of the sensors 204 and 208 may have different capture periods that may or may not be based on different triggers.

The captured navigational measurements may be used by the position module to determine a translation of the IT device 200 relative to a reference location, e.g., the sensors 204($t=0$) and 208($t=0$) as well as a rotation of the IT device 200. In some embodiments, the translation of the device 200 may be determined by analyzing navigational measurements from a first sensor, e.g., sensor 204, while the rotation of the device 200 may be determined by analyzing navigational measurements from a second sensor, e.g., sensor 208. In particular, and in accordance with some embodiments, the rotation of the IT device 200 may be determined by comparing translation information derived from the navigational measurements provided by sensor 208 to translation information derived from navigational measurements provided by sensor 204. Determining both the translation and the rotation of the IT device 200 may allow the accurate positioning of all of the nozzles of the print head 212.

The translation of the sensors 204 and 208 may be determined within the context of a world-space (w-s) coordinate system, e.g., a Cartesian coordinate system. In particular, the translation values may be determined for two-dimensions of the w-s coordinate system, e.g., the x-axis and the y-axis as shown in FIG. 5. For example, the position module may accumulate the incremental $\Delta x$'s and $\Delta y$'s between successive time periods in order to determine the total translation of the sensors 204 and 208 from time zero to time four. The accumulated changes for sensor 204 may be referred to as $\Delta x_1$ and $\Delta y_1$ and the accumulated changes for sensor 208 may be referred to as $\Delta x_2$ and $\Delta y_2$. The sensors 204 and 208 may be a distance d from one another. The rotation $\theta$ of the IT device 200 may then be determined by the following equation:

$$\theta = \sin^{-1}\left(\frac{|\Delta x_2 - \Delta x_1|}{d}\right). \qquad \text{Eq. 1}$$

In some embodiments, each of the sensors 204 and 208 may report incremental delta values within their respective coordinate systems, which may then be mapped to the w-s coordinate system to provide the w-s translation and/or rotation values. As may be seen from Eq. 1, the rotation $\theta$ is derived in part by providing the distance d in the denominator of the arcsin value. Accordingly, a large distance d may provide a more accurate determination of the rotation $\theta$ for a given sensor resolution. Therefore, in designing the IT device 200, the distance d may be established based at least in part on the resolution of the data output from the sensors 204 and 208. For example, if the sensors 204 and 208 have a resolution of approximately 1600 counts per inch, the distance d may be approximately two inches. In an embodiment having this sensor resolution and distance d, the rotation $\theta$ may be reliably calculated down to approximately 0.0179 degrees.

While the embodiment shown in FIG. 2 illustrates the sensors 204 and 208 located on a first side of the print head 212, other configurations may be employed while still maintaining the desired distance d. For example, the sensors 204 and 208 may be on opposite sides of the print head 212. The configuration employed may be selected based on objectives of a particular embodiment. For example, disposing both sensors 204 and 208 on the same side of the print head 212 may limit the potential for ink contamination on the sensors 204 and 208 when printing and may allow more time for ink to dry on the medium before a second print pass is made in the same area, where the wet medium may induce more drag when the unit passes through the partially printed zone. In another example, placing the sensors 204 and 208 on opposite sides of the print head 212 may facilitate a detection of an edge of the medium.

Referring again to FIG. 4, following position determination at block 412, the position module may determine whether the positioning operation is complete at block 416. If it is determined that the positioning operation is not yet complete, the operation may loop back to block 412. If it is determined that it is the end of the positioning operation, the operation may end in block 420. The end of the positioning operation may be tied to the end of a printing operation, which is further described herein with reference to FIG. 11.

In accordance with various embodiments of the present invention, pre-marked (pre-tagged) paper using a marking technology that is not visible to the human eye such as, for example, yellow or infrared on a paper medium, is used as a print medium. This pre-tagged medium has markings or tags encoded on its surface that provide absolute X, Y position information relative to the actual position that the data was encoded on the medium. To decode or determine the position data, navigation sensors 204 and 208 are CMOS sensors that are able to read the encoded information on the pre-tagged medium in order to extract the absolute X, Y position data. Thus, this embodiment of the present invention uses CMOS imaging sensors tuned to the light wave of the encoded marking on the medium that may read the absolute encoded X, Y position information on the medium while the IT device 200 is in motion. This embodiment allows the IT device 200 to extract absolute position information for each position measurement. With this type of approach, the position errors are not cumulative. As with the embodiments that use optical navigation technology, this embodiment again includes a configuration using two sensors 204 and 208 that each provides the absolute X, Y position data that is then used to calculate the angular accuracy for the print head position that is desired in order to support printing. Additionally, velocity of the IT device 200 may also be determined by calculating the changes in position and the time involved with the changes in position.

Thus, in this type of embodiment, the print medium needs to be pre-printed with the tag information. In accordance with various embodiments, the marking information is infrared encoding and thus, the navigation sensors 204 and 208 are IR CMOS imaging sensors that may capture the IR signature that is only readable under IR illumination (and therefore not visible to the human eye). The IR signature or tag information may consist of a regular pattern and a field of digitally encoded data. The regular pattern may be used to determine small scale position offsets and rotation. The data may provide the absolute position on the medium. An example of IR CMOS sensors and pre-tagged paper technology is provided by Silverbrook research in Sydney, Australia.

Figure 6:
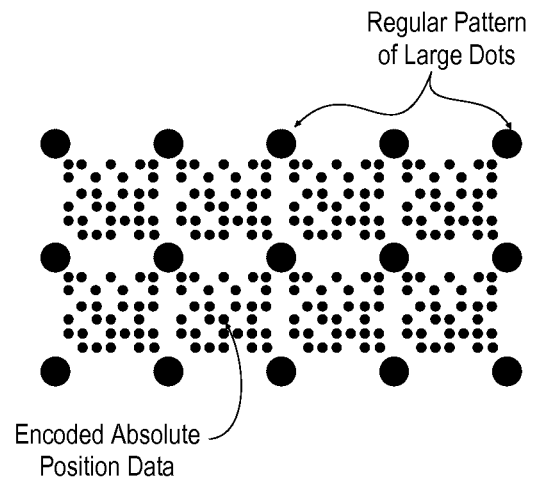
FIG. 6 schematically illustrates an example of an IR tag pattern in accordance with various embodiments of the present invention.

FIG. 6 illustrates a schematic example of an IR tag pattern. The pre-printed tags are processed to yield an overall position and angle of each sensor 204 and 208. The position information of the two sensors 204 and 208 is used to create a composite position and rotation of the IT device 200 printing system. It should be understood that the tags in FIG. 6 are magnified. In actual use, the tags would be printed with ink that absorbs in the IR spectrum and not in the visible spectrum making the markings invisible to the naked eye. Moreover, the encoded absolute position data of the pre-printed tags, patterns, or markings typically vary from one another (not depicted in FIG. 6) to provide a unique signal that corresponds with a unique location on a medium upon which the tags are formed.

Since the position information delivered by the sensors 204 and 208 are absolute with respect to the print medium, very little processing is necessary to determine the final position information. In accordance with various embodiments, the position data from the sensors 204 and 208 are scaled to a local form of 16.16 integer data. The 16 bit super radix data is the position in 300th's of an inch to correspond to the resolution of the print system. The two positions are averaged to incorporate the data from both sensors 204 and 208 in the final position. Averaging reduces the position noise. The datum of the resultant position is the midpoint between the centers of the two sensors 204 and 208.

In accordance with various embodiments of the present invention, since the printing system of the IT device 200 desires new position data every millisecond or even faster, intermediate positions are predicted. A simple first order predictive interpolation may achieve reasonable results. The last two measured positions may be used to compute an X and Y derivative. Interpolated points may be computed by the following equations:

$$Xi = Xs + dx/dt * T \qquad \text{Eq. 2}$$

$$Yi = Ys + dy/dt * T \qquad \text{Eq. 3}$$

In order to deal with changes in velocity and acceleration, a two dimensional parametric curve function may be employed. The two dimensional parametric curve describes the motion of the IT device 200 as a parametric equation with time (t) as the parametric value.

$$X = A_x t^3 + B_x t^2 + C_x t + D_x$$

$$Y = A_y t^3 + B_y t^2 + C_y t + D_y \qquad \text{Eqs. 4 and 5}$$

Equations 5 and 6 represent the form of a Bicubic Spline, a two dimensional parametric curve. In equations 4 and 5, the coefficients correspond to the starting position (D), velocity (C), acceleration (B), and the rate change of the acceleration (A) in the X and Y axes. There are numerous methods known in the art for determining the coefficients for these equations. One well known method, the Catmull Rom Bicubic Spline, offers the advantage of ensuring that the resulting equations will contain the input control points.

Figure 7:
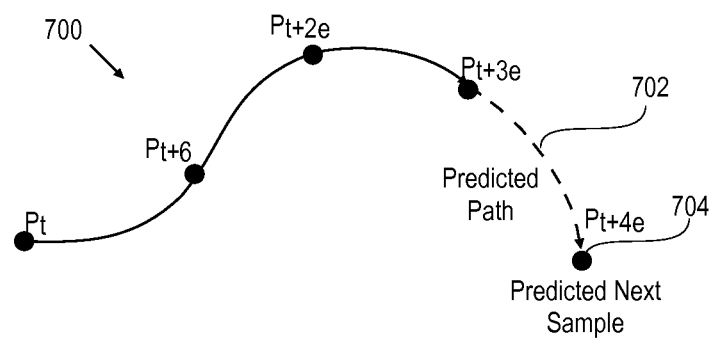
FIG. 7 schematically illustrates an example of a position path in accordance with various embodiments of the present invention.

Referring to FIG. 7, with a 3rd degree equation, four points are generally required to establish all four coefficients for the two equations. The X and Y axes may be treated separately. The sample points may be taken at equal intervals of time. This helps insure that the arc length of the curve is interpreted correctly. If the points on the curve are at widely varying intervals, then the time domain has to be separately smoothed to yield correct prediction results.

Although the Catmull Rom Bicubic Spline coefficients help ensure that the sampled history will be included in the curve 700 defined by the equations, the Predicted Path portion 702 of the curve will not necessarily exactly match the actual path. In order to evaluate the performance of this embodiment, a Predicted Next sample 704 at t+4e may be compared to a next actual position measured by at least one of the sensors 204 and 208.

To compute an angle of the IT device 200, the difference in the X and Y positions may be first determined. The X difference is divided by the Y difference. To accomplish this, the values of X and Y may be adjusted to best take advantage of limited 32 bit integer arithmetic that may be native to the position module 134.

Figure 8:
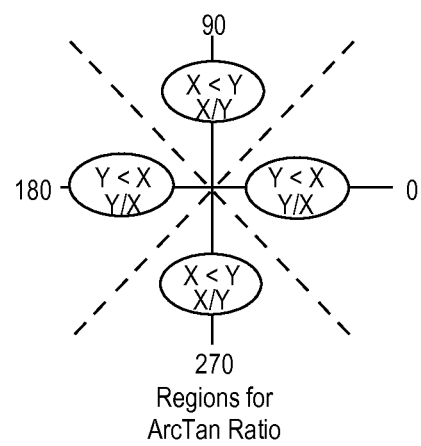
FIG. 8 schematically illustrates regions for ArcTan ratio in accordance with various embodiments of the present invention.

In accordance with various embodiments, the ratio, X/Y, may be used to determine the Arc Tangent, for example by looking it up in a table. The result of the table lookup is the angle of the IT device 200 with respect to the pre-printed grid of encoded Tag information on the print medium. The table may be represented by a range of 0 to 45 degrees in a table that is 16K (K=1024) locations long. The ratio may also be represented as Y/X, when the X value is larger than the Y value. This limits the range of the ratio to numbers that are less than one and avoids the singularity of dividing by zero as the angle approaches 90 degrees and 270 degrees. FIG. 8 illustrates regions for the Arc Tangent ratio.

Using the position and angle information, the position of the IT device 200, and thereby the print head 212, may be determined by the same two dimensional space rotation that was previously described with reference to FIG. 5 based on a traditional optical navigation based system.

The result is that the position of the printing of IT device 200 is fixed to the print medium. To move the starting position of the image on the page, a starting position is captured just before printing starts, as previously described with reference to FIG. 4. This initial position is subtracted from the absolute position, allowing the image to be placed anywhere on the print medium. In order to print at odd angles, the initial angle of the IT device 200 may be captured. When the print offset angle is not zero, the position information should be rotated to affect a rotation of the image on the print medium.

Before the position information is conveyed to the print system, the positions are rotated about the initial or start position of the image. The result is a position and angle relative print.

$$X_r = X*\text{Cos} - Y*\text{Sin} \quad \text{Eq. 6}$$

$$Y_r = X*\text{Sin} + Y*\text{Cos} \quad \text{Eq. 7}$$

For convenience, the angle may be snapped to the 0, 90, 180 and 270 offsets. To do this, the angle may be forced to one of the 4 snap angles. The "snap" occurs when the angle is within a small range close to the 90 degree snap angles.

After the position and angle of the IT device 200 is computed by the position module 134, the information is passed to the print head 212, which may compute the position of every nozzle with respect to the image and fires the relevant nozzles.

Embodiments described herein with respect to pre-printed tags and associated configurations and techniques may provide a variety of benefits. In an embodiment, pre-tagged positioning techniques provide a method to determine and predict absolute position information using CMOS imaging sensors, eliminate limitations of measurement accuracy and position drift associated with other mouse-type sensors, provide a user-friendly way for a handheld device to discover, track, or determine printer position during a print process, and/or provide a user-friendly way for a handheld device to determine absolute position when lifted from the medium and returned back to the medium.

Figure 9:
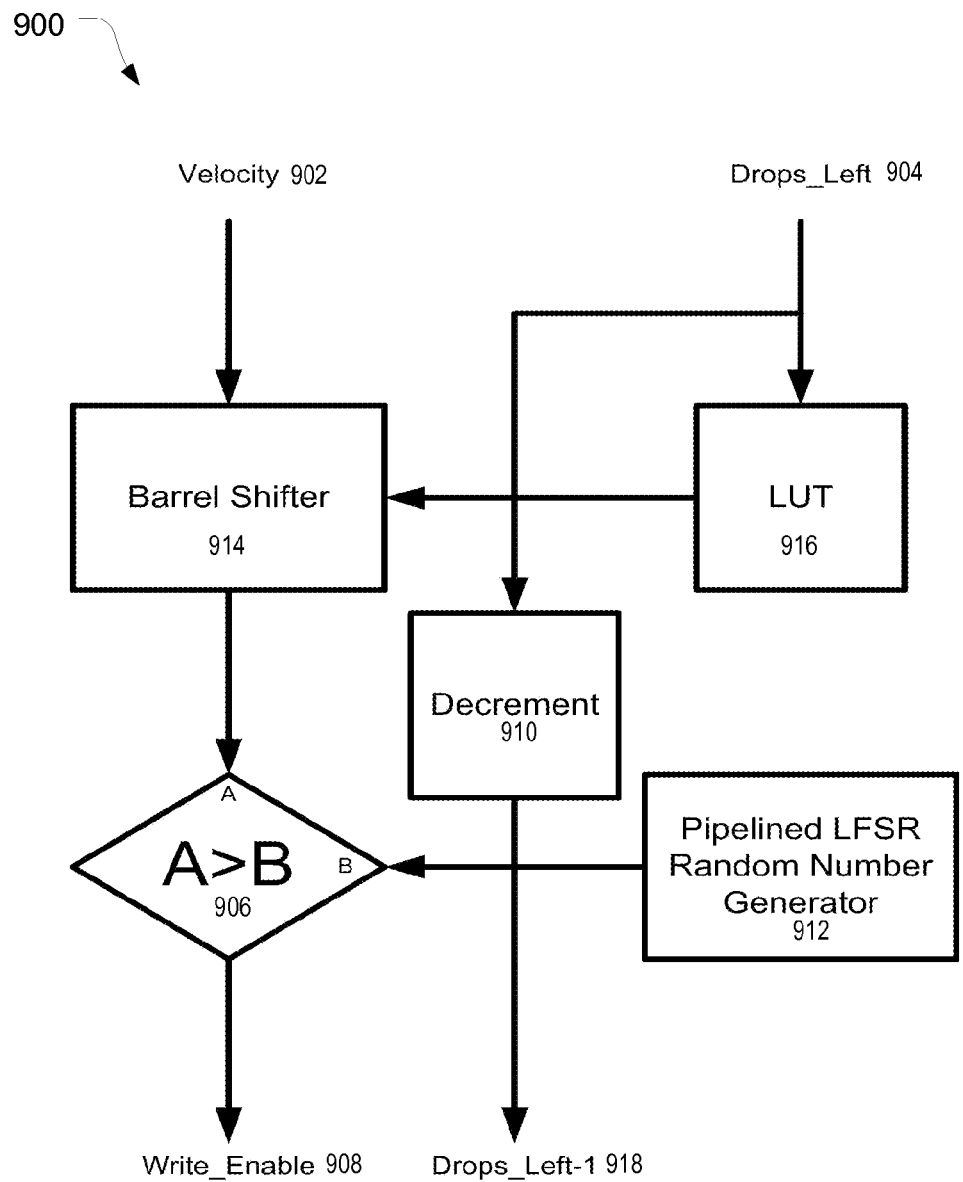
FIG. 9 is a flow diagram depicting an implementation of a pseudo-random filter in accordance with various embodiments of the present invention.

FIG. 9 is a flow diagram depicting an implementation of a pseudo-random filter 900 in accordance with various embodiments of the present invention. IT device 104 may be a handheld device according to various embodiments. In an embodiment, such a handheld device includes a filter 900 coupled to the I/O module 132 to regulate a rate of deposition of a printing substance by the I/O module 132. Filter 900 may include a comparator 906 to compare a print velocity term, A, with a random or pseudo-random number, B, to determine whether to deposit a discrete amount of printing substance. In an embodiment, if A>B, then the I/O module 132 is write enabled, Write_Enable 908, to print a discrete amount of printing substance. In an embodiment, print velocity term 902 may be a variable threshold that allows printing at a particular location if A>B in comparator 906. Else, if A<B, printing may not be allowed.

In a particular embodiment, after position, and/or angle, and/or velocity are determined by position module 134, such position and/or angle, and/or velocity information is passed to the I/O module 132, which may compute the position of every nozzle with respect to the image. I/O module 132 may determine or receive information from other elements of control block 108 about a quantity of printing substance to be deposited at a location on a surface adjacent to the handheld device. The quantity of printing substance may be, for example, a number of ink drops, Drops_Left 904, to be deposited at a location on the surface. The location on the surface may be represented by an image pixel byte in image memory. In an embodiment, Drops_Left 904 is a value retrieved from image memory and represents a number of ink drops available for a particular image cell.

In an embodiment, if an image pixel byte has a print velocity term, A, larger than random or pseudo-random number, B, at the memory location, the nozzle is enabled 908 to print and the value of the Drops_Left 904 counter for that location is decremented by decrementer 910 to Drops_Left-1 918. Decrement counter 910 may be configured to reduce the quantity of printing substance to be deposited, Drops_Left 904, when the print velocity term, A, is greater than the random or pseudo-random number, B, as determined by the comparator 906. If the image pixel byte, has a print velocity term, A, smaller than the random or pseudo-random number, B, at the memory location, the nozzle is not enabled to print and the value of the Drops_Left 904 counter for that location remains the same.

The random or pseudo-random number, B, may be generated by any well-known method, including a linear feedback shift register (LFSR). In an embodiment, a random number generator or pseudo-random number generator 912 is coupled with the comparator to provide the random or pseudo-random number. Requirements for randomness may be minimal to provide benefits of filter 900 described herein. In an embodiment, a pseudo-random number is generated using a LFSR 912 that is pipelined or otherwise configured to deliver a new pseudo-random number every clock cycle. In other embodiments, a Galois implementation of a 16 bit or 32 bit LFSR is sufficient to provide a random or pseudo-random number, B. In another embodiment, well-known methods that provide about 8 to about 11 bit random numbers using minimal hardware are used to provide a random or pseudo-random number, B. Subject matter is not limited in this regard and other techniques and configurations may be used to generate random or pseudo-random number, B, in other embodiments.

Values for a print velocity term 902 may be proportional to a velocity of handheld device such that a print rate of I/O module 132 is constant or about constant with respect to a distance moved by handheld device. Velocity of handheld device may be determined by position module 134 using sensors 138 as described herein. Correlating a print rate to a velocity of a handheld device may provide a relatively slower print rate for slower movement of a handheld device and relatively faster print rates for faster movement of the handheld device. Velocity 902 may be a scaled representation of motion velocity of handheld device in this regard and Velocity 902 may be normalized to achieve a desired print density. Such technique may provide a print density that is substantially constant with respect to velocity of handheld device movement. A maximum print rate may be reached at higher velocities of motion of handheld device. In such case, a print density may be reduced. Print velocity term 902 may be rapidly increased as an amount of printing substance to be deposited at a particular location on a surface approaches zero to accelerate completion of the image and to avoid too many passes of the handheld device over the surface to complete the image.

A Barrel shifter 908 or other form of multiplier or incrementing device may be coupled to the comparator 906 to increase or set a print velocity term, Velocity 902, according to embodiments herein. Barrel shifter 908 or other form of value-setting device may set a value for print velocity term, Velocity 902, prior to comparing the print velocity term in comparator 906, and output the new value for print velocity term, A, to comparator 906. Barrel shifter 914 or other value-setting device may rely on a look-up table (LUT) 916, for example, to determine how to modify print velocity term, Velocity 902, based on the quantity of printing substance to be deposited, Drops_Left 904. LUT 916 may include for example modeled values of a print velocity term, Velocity 902, for a given quantity of printing substance to be deposited, Drops_Left 904, to provide a print rate in accordance with embodiments described herein. For example, LUT 916 may be configured to accelerate a probability of an ink drop being placed on a surface as a number Drops_Left 904 gets lower. LUT 916 may be further configured to output a value to the barrel shifter 914. Other well-known techniques to provide an increasing Velocity 902 for a decreasing quantity of printing substance to be deposited, Drops_Left 904, at a location on a surface may be used in other embodiments.

A filter 900 implemented as described herein may increase print quality of an image printed by a handheld device. Filter 900 may allow an image to be printed by making multiple passes of a handheld device over a same location on a surface adjacent the handheld device. In an embodiment, all printing substance such as ink, for example, to be deposited to a particular location is not deposited in a single pass, but during multiple passes over the particular location. Filter 900 may allow random, and/or partial printing of a swath such that not all printing substance designated for a particular location is deposited in a single pass. Such technique may reduce single pass artifacts caused by positioning errors and/or decrease variations of print density in a printed image by a handheld IT device 104.

Figure 10:
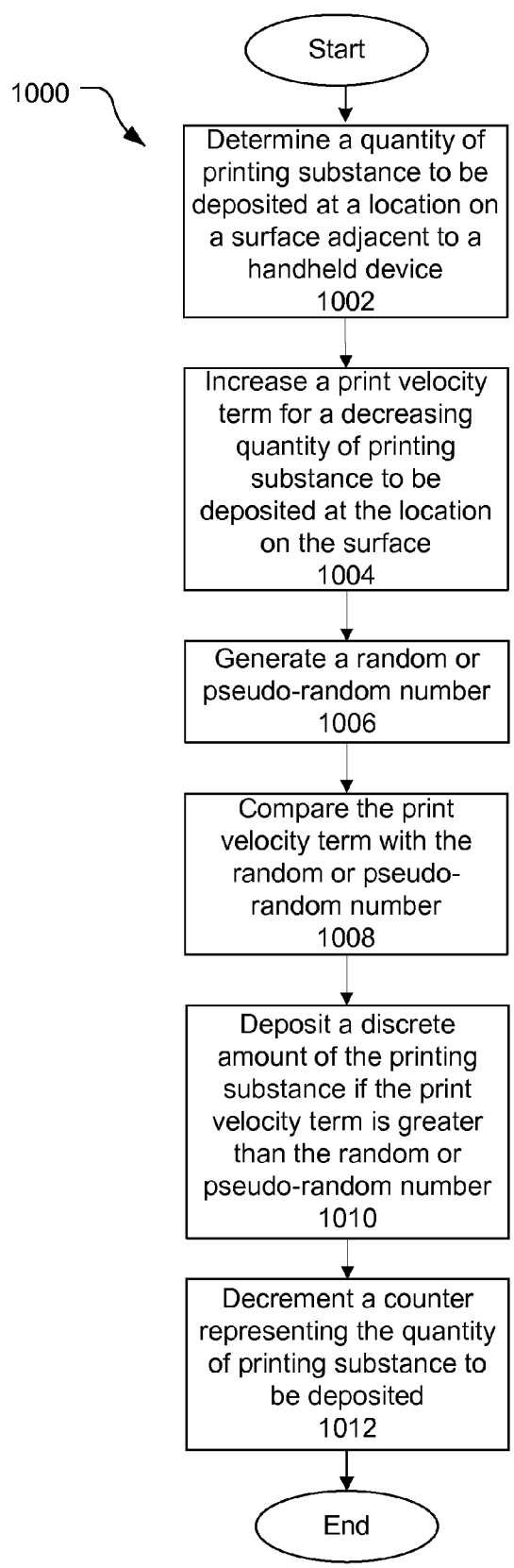
FIG. 10 is a flow diagram of a filtering method in accordance with various embodiments of the present invention.

FIG. 10 is a flow diagram of a filtering method in accordance with various embodiments of the present invention. In an embodiment, method 1000 includes determining a quantity of printing substance to be deposited at a location on a surface adjacent to a handheld device at block 1002, increasing a print velocity term for a decreasing quantity of printing substance to be deposited at the location on the surface at block 1004, generating a random or pseudo-random number at block 1006, comparing the print velocity term with the random or pseudo-random number at block 1008, depositing a discrete amount of the printing substance if the print velocity term is greater than the random or pseudo-random number at block 1010, and decrementing a counter representing the quantity of printing substance to be deposited at block 1012.

Method 1000 may be a method of regulating a rate of deposition of a printing substance. In an embodiment, method 1000 uses a filter 900 in accordance with embodiments described with respect to FIG. 9. In an embodiment, method 1000 includes comparing a print velocity term with a random or pseudo-random number 1008, wherein the print velocity term is a variable threshold, and depositing a discrete amount of the printing substance only if the print velocity term is greater than the random or pseudo-random number 1010.

Method 1000 may further include determining a quantity of printing substance to be deposited at a location on the surface 1002, and increasing the print velocity term for a decreasing quantity of printing substance to be deposited at the location on the surface 1004. In an embodiment, increasing the print velocity term for a decreasing quantity of printing substance 1004 is performed by a barrel shifter 914. In an embodiment, increasing the print velocity term for a decreasing quantity of printing substance 1004 is based on a value from a look-up table having increasing print velocity values that correspond with decreasing quantity of printing substance.

Increasing the print velocity term for a decreasing quantity of printing substance 1004 may accelerate as the quantity of printing substance to be deposited at the location on the surface approaches zero. In an embodiment, increasing the print velocity term for a decreasing quantity of printing substance 1004 is performed such that a rate of deposition of a printing substance on a surface is proportional to a velocity of the handheld device as determined by the position module. In an embodiment, such velocity-proportional deposition rate allows a substantially constant print density for variable speeds of handheld device movement.

Method 1000 may further include decrementing a counter representing a quantity of printing substance to be deposited at a location on a surface 1012 if the print velocity term is greater than the random or pseudo-random number, and generating the random or pseudo-random number 1006. Generating the random or pseudo-random number 1006 may be accomplished using a linear feedback shift register (LFSR) that is configured to deliver a new pseudo-random number every clock cycle. Subject matter is not limited in this regard and may include other methods of generating random or pseudo-random numbers in other embodiments.

In an embodiment, regulating a rate of deposition of a printing substance using techniques described herein may increase print quality on a surface and/or provide other benefits described elsewhere herein. Method 1000 may accord with embodiments described herein.

Figure 11:
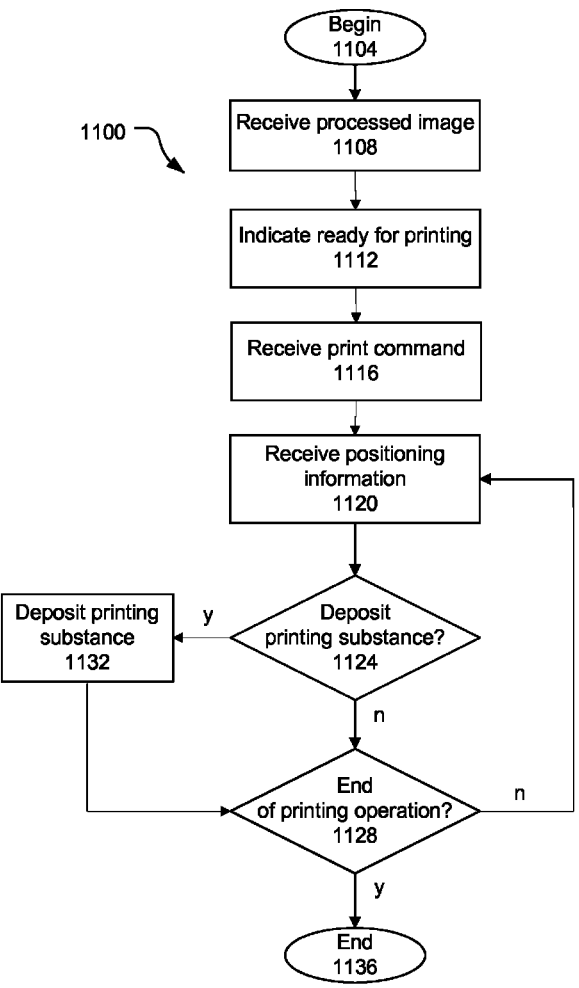
FIG. 11 is a flow diagram depicting a printing operation of a handheld image translation device in accordance with various embodiments of the present invention.

FIG. 11 is a flow diagram 1100 depicting a printing operation of the IT device 200 in accordance with various embodiments of the present invention. The printing operation may begin at block 1104. The print module may receive a processed image from the image processing module at block 1108. Upon receipt of the processed image, the display 308 may indicate that the IT device 200 is ready for printing at block 1112.

The print module may receive a print command generated from a user activating the IT control input 304 at block 1116. The print module may then receive positioning information from the position module at block 1120. The print module may then determine whether to deposit printing substance at the given position at block 1124. The determination as to whether to deposit printing substance may be a function of the total drop volume for a given location and the amount of volume that has been previously deposited.

The print module may make a determination to deposit printing substance by reading a representation of the printed image in memory. If the print module determines that printing substance is to be deposited, it may modify the image representation to account for the amount and location of deposited printing substance. The print module may use the modified representation to determine if additional deposition of printing substance is required. The print module may use the modified representation to alter the amount of printing substance deposited.

If it is determined that no additional printing substance is to be deposited at block 1124, the operation may advance to block 1128 to determine whether the end of the print operation has been reached. If it is determined that additional printing substance is to be deposited at block 1124, the print module may cause an appropriate amount of printing substance to be deposited at block 1132 by generating and transmitting control signals to the print head that cause the nozzles to drop the printing substance.

As may be seen, the position module's determination of the translation and rotation of the IT device 200 is done prior to the print module controlling the print head to deposit a printing substance. In order for the positioning information to remain relevant to the print determination, it may be desirable that the determination of the positioning information take place as soon as possible after the acquisition of the navigational measurements upon which it is based. Accordingly, the translation and rotation calculations may be done in real time based on data accumulated up to that point. The rotation calculations are not determined retroactively based on a comprehensive accumulation of translation and image data as is done in prior art scanning devices discussed above.

The determination of whether the end of the printing operation has been reached at block 1128 may be a function of the total printed volume versus the total anticipated print volume. In some embodiments the end of the printing operation may be reached even if the total printed volume is less than the total anticipated print volume. For example, an embodiment may consider the end of the printing operation to occur when the total printed volume is ninety-five percent of the total anticipated print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually canceling the operation.

If, at block 1128, it is determined that the printing operation has been completed, the printing operation may conclude at block 1136.

If, at block 1128, it is determined that the printing operation has not been completed, the printing operation may loop back to block 1120.

Figure 12:
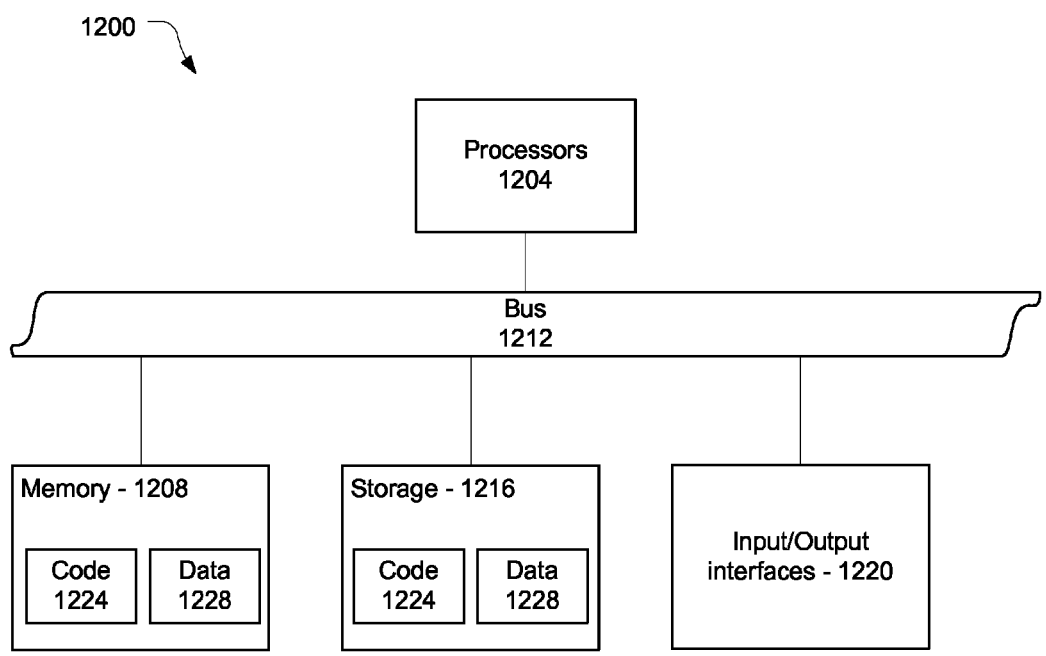
FIG. 12 illustrates a computing device capable of implementing a control block of a handheld image translation device in accordance with various embodiments of the present invention.

FIG. 12 illustrates a computing device 1200 capable of implementing a control block, e.g., control block 108, in accordance with various embodiments. As illustrated, for the embodiments, computing device 1200 includes one or more processors 1204, memory 1208, and bus 1212, coupled to each other as shown. Additionally, computing device 1200 includes storage 1216, and one or more input/output interfaces 1220 coupled to each other, and the earlier described elements as shown. The components of the computing device 1200 may be designed to provide the printing and/or positioning functions of a control block of an IT device as described herein.

Memory 1208 and storage 1216 may include, in particular, temporal and persistent copies of code 1224 and data 1228, respectively. The code 1224 may include instructions that when accessed by the processors 1204 result in the computing device 1200 performing operations as described in conjunction with various modules of the control block in accordance with embodiments of this invention. The processing data 1228 may include data to be acted upon by the instructions of the code 1224. In particular, the accessing of the code 1224 and data 1228 by the processors 1204 may facilitate printing and/or positioning operations as described herein.

The processors 1204 may include one or more single-core processors, multiple-core processors, controllers, application-specific integrated circuits (ASICs), etc.

The memory 1208 may include random access memory (RAM), dynamic RAM (DRAM), static RAM (SRAM), synchronous DRAM (SDRAM), dual-data rate RAM (DDRRAM), etc.

The storage 1216 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1216 may be a storage resource physically part of the computing device 1200 or it may be accessible by, but not necessarily a part of, the computing device 1200. For example, the storage 1216 may be accessed by the computing device 1200 over a network.

The I/O interfaces 1220 may include interfaces designed to communicate with peripheral hardware, e.g., I/O components 112, navigation sensors 138, etc., and/or remote devices, e.g., image transfer device 120.

In various embodiments, computing device 1200 may have more or less elements and/or different architectures.

While embodiments of the present invention have been described with respect to handheld IT devices, those skilled in the art will understand that various aspects of embodiments may be applied to other types of handheld devices.

Various methods and/or operations may have been described herein as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein for purposes of description of preferred embodiments, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A handheld device comprising:
   an input/output (I/O) module configured to print images on a surface adjacent to the handheld device as the handheld device is being moved across the surface;
   a position module operatively coupled to the I/O module, wherein the position module is configured to estimate a velocity of the handheld device as the handheld device is being moved across the surface;
   a filter coupled to the I/O module, wherein the filter is configured to based at least in part on (i) the estimated velocity of the handheld device and (ii) a quantity of printing substance to be deposited on the surface adjacent to the handheld device, generate a print velocity term, generate a random number or a pseudo-random number, compare the print velocity term with the generated random number or the pseudo-random number, and in response to comparing the print velocity term with the generated random number or the pseudo-random number, regulate a rate of deposition of the printing substance on the surface adjacent to the handheld device as the I/O module prints images on the surface adjacent to the handheld device.

2. The handheld device of claim 1, wherein in response to the quantity of the printing substance to be deposited on the surface adjacent to the handheld device decreasing below a threshold quantity, the filter is further configured to increase the print velocity term.

3. The handheld device of claim 1, wherein the filter is further configured to increase the print velocity term with a decrease in the quantity of the printing substance to be deposited on the surface adjacent to the handheld device.

4. The handheld device of claim 1, the filter is further configured to:
increases the print velocity term with an increase in the estimated velocity of the handheld device; and
decrease the print velocity term with a decrease in the estimated velocity of the handheld device.

5. The handheld device of claim 1, wherein the filer comprises:
a random number generator or a pseudo-random number generator configured to generate the random number or the pseudo-random number.

6. The handheld device of claim 1, wherein the filer comprises a look-up table configured to:
receive an indication of the quantity of the printing substance to be deposited on the surface adjacent to the handheld device; and
in response to receiving the indication of the quantity of the printing substance to be deposited on the surface adjacent to the handheld device, generate an output value, wherein the print velocity term is generated based on the output value.

7. The handheld device of claim 6, wherein the filer comprises a barrel shifter configured to:
receive (i) the estimated velocity of the handheld device and (ii) the output value from the look-up table;
based on the estimated velocity of the handheld device, generate an intermediate print velocity term; and
based on the output value from the look-up table, selectively increase the intermediate print velocity term to generate the print velocity term.

8. The handheld device of claim 1, wherein the filter module is further configured to:
in response to the print velocity term being higher than the generated random number or the pseudo-random number, enable a deposition of the printing substance on the surface adjacent to the handheld device as the I/O module prints images on the surface adjacent to the handheld device; and
in response to the print velocity term being lower than the generated random number or the pseudo-random number, refrain from depositing the printing substance on the surface adjacent to the handheld device as the I/O module prints images on the surface adjacent to the handheld device.

9. The handheld device of claim 8, further comprising:
a decrement counter configured to, in response to the filter module enabling the deposition of the printing substance on the surface adjacent to the handheld device, decrement an indication of the quantity of printing substance to be deposited on the surface adjacent to the handheld device.

10. The handheld device of claim 1, wherein the handheld device is a printer.

11. The handheld device of claim 1, wherein the handheld device is an image translation device configured to print and to scan.

12. A method of operating a handheld device, the method comprising:
estimating a velocity of the handheld device as the handheld device is being moved across a surface adjacent to the handheld device;
based at least in part on (i) the estimated velocity of the handheld device and (ii) a quantity of printing substance to be deposited on the surface adjacent to the handheld device, generating a print velocity term;
generating a random number or a pseudo-random number;
comparing the print velocity term with the random number or the pseudo-random number; and
in response to comparing the print velocity term with the generated random number or the pseudo-random number, regulating a rate of deposition of the printing substance on the surface adjacent to the handheld device as the handheld device prints an image on the surface adjacent to the handheld device.

13. The method of claim 12, wherein generating the print velocity term further comprises:
in response to the quantity of the printing substance to be deposited on the surface adjacent to the handheld device decreasing below a threshold quantity, increasing the print velocity term.

14. The method of claim 12, wherein generating the print velocity term further comprises:
increasing the print velocity term with a decrease in the quantity of the printing substance to be deposited on the surface adjacent to the handheld device.

15. The method of claim 12, wherein generating the print velocity term further comprises:
increasing the print velocity term with an increase in the estimated velocity of the handheld device; and
decreasing the print velocity term with a decrease in the estimated velocity of the handheld device.

16. The method of claim 12, wherein generating the random number or a pseudo-random number further comprises:
generating the random number or the pseudo-random number independent of the velocity of the handheld device.

17. The method of claim 12, wherein generating the random number or a pseudo-random number further comprises:
generating, by a random number generator or a pseudo-random number generator, the random number or the pseudo-random number.

18. The method of claim 12, further comprising:
receiving an indication of the quantity of the printing substance to be deposited on the surface adjacent to the handheld device; and
in response to receiving the indication of the quantity of the printing substance to be deposited on the surface adjacent to the handheld device, generating an output value, wherein the print velocity term is generated based on the output value.

19. The method of claim 18, wherein generating the print velocity term further comprises:

receiving (i) the estimated velocity of the handheld device and (ii) the output value from the look-up table;

based on the estimated velocity of the handheld device, generating an intermediate print velocity term; and based on the output value from the look-up table, selectively increasing the intermediate print velocity term to generate the print velocity term.

20. The method of claim 12, further comprising:

in response to the print velocity term being higher than the generated random number or the pseudo-random number, enabling a deposition of the printing substance on the surface adjacent to the handheld device as the I/O module prints images on the surface adjacent to the handheld device; and in response to the print velocity term being lower than the generated random number or the pseudo-random number, refraining from depositing the printing substance on the surface adjacent to the handheld device as the I/O module prints images on the surface adjacent to the handheld device.

* * * * *